(12) United States Patent
Prager

(10) Patent No.: US 8,443,823 B1
(45) Date of Patent: May 21, 2013

(54) FLOOD DETECTION AND VALVE SHUTOFF DEVICE

(76) Inventor: Irwin D. Prager, Staten Island, NY (US)

( * ) Notice: Subject to any disclaimer, the term of this patent is extended or adjusted under 35 U.S.C. 154(b) by 0 days.

(21) Appl. No.: 13/280,007

(22) Filed: Oct. 24, 2011

(51) Int. Cl.
*F16K 17/40* (2006.01)
(52) U.S. Cl.
USPC ............ 137/68.11; 137/312; 251/67; 251/73; 251/74; 251/313; 251/303
(58) Field of Classification Search
USPC ............... 137/68.11, 312; 251/67, 73, 74, 251/313, 303; 122/504, 507, 14.3
See application file for complete search history.

(56) References Cited

U.S. PATENT DOCUMENTS

| | | | | |
|---|---|---|---|---|
| 1,467,615 A | * | 9/1923 | Fairbanks | 137/242 |
| 1,499,446 A | * | 7/1924 | Code | 251/352 |
| 2,798,503 A | * | 7/1957 | Carver et al. | 137/67 |
| 3,920,031 A | * | 11/1975 | Maxfield | 137/67 |
| 4,305,420 A | | 12/1981 | Nussdorf | |
| 4,324,268 A | | 4/1982 | Jacobson | |
| 4,938,453 A | * | 7/1990 | Blanchard | 251/313 |
| 5,086,806 A | | 2/1992 | Engler et al. | |
| 5,188,143 A | * | 2/1993 | Krebs | 137/312 |
| 5,568,825 A | | 10/1996 | Faulk | |
| 5,632,302 A | * | 5/1997 | Lenoir, Jr. | 137/312 |
| 5,967,171 A | | 10/1999 | Dwyer, Jr. | |
| 6,024,116 A | * | 2/2000 | Almberg et al. | 137/312 |
| 6,057,770 A | | 5/2000 | Justesen | |
| 6,206,337 B1 | * | 3/2001 | Veillet, Jr. | 251/67 |
| 6,253,785 B1 | * | 7/2001 | Shumake, Jr. et al. | 137/312 |
| 6,389,852 B1 | | 5/2002 | Montgomery | |
| 6,533,243 B1 | * | 3/2003 | Sumner et al. | 251/313 |
| 6,675,826 B1 | | 1/2004 | Newman et al. | |
| 6,899,122 B1 | * | 5/2005 | Mele | 137/312 |
| 7,562,673 B1 | * | 7/2009 | Martin et al. | 137/312 |
| 7,665,482 B2 | * | 2/2010 | McLean | 137/420 |
| 7,753,071 B2 | | 7/2010 | Wood | |
| 8,061,380 B1 | * | 11/2011 | Martin et al. | 137/312 |
| 2007/0289635 A1 | | 12/2007 | Ghazarian et al. | |

* cited by examiner

*Primary Examiner* — Eric Keasel
*Assistant Examiner* — Minh Le
(74) *Attorney, Agent, or Firm* — Richard L. Miller

(57) ABSTRACT

A flood detection and valve shutoff device which comprises a water sensitive sensor. A mechanism is for retaining the water sensitive sensor on a floor near a water heater. Another mechanism is for biasing a valve in a water inlet pipe of the water heater to a closed position. A lanyard in a taut condition extends between the water sensitive sensor and the biasing mechanism, so as to keep the valve in an open position. When the water sensitive sensor detects water on the floor the lanyard will be released from the water sensitive sensor, causing the biasing means to move the valve from the open position to the closed position.

6 Claims, 6 Drawing Sheets

US 8,443,823 B1

FLOOD DETECTION AND VALVE SHUTOFF DEVICE

BACKGROUND OF THE INVENTION

1. Field of the Invention

The present invention relates to a water leak prevention system, and more particularly, a flood detection and valve shutoff device.

2. Description of the Prior Art

Numerous innovations for various emergency shutoff systems have been provided in the prior art that will be described. Even though these innovations may be suitable for the specific individual purposes to which they address, however, they differ from the present invention.

A FIRST EXAMPLE, U.S. Patent Office Document No. 4,305,420, Issued on Dec. 15, 1981, to Nussdorf teaches an automatic water safety valve assembly having sensors adapted to be placed in various locations on the floors of a building so that an expandable element in each of the sensors having an electrically conductive plate expands when wetted to operate a circuit which causes the water safety valve to close and shut off the main water line to the building. The valve, when activated, also operates a power interrupter which deactivates the connections to the device from the AC power source.

A SECOND EXAMPLE, U.S. Patent Office Document No. 4,324,268, Issued on Apr. 13, 1982, to Jacobson teaches an automatic flood control valve apparatus having a normally open valve, in combination with a latching relay for closing the valve, which latches the valve in a closed position when the relay is energized and until it is manually reset, and a single transistor sensor circuit for energizing the relay in response to a flood. A power supply circuit is also disclosed.

A THIRD EXAMPLE, U.S. Patent Office Document No. 5,086,806, Issued on Feb. 11, 1992, to Engler et al. teaches an automatic fluid-flow control system for controlling the quantity of fluid allowed to flow uninterrupted through a conduit. It is particularly useful in controlling potentially damaging floods caused by breakage in a branch plumbing line used to supply water to beverage dispensing appliances, ice-making machines and similar devices which repeatedly consume limited quantities of water in relatively short flow cycles. The fluid-flow control system includes a flow meter which emits a signal containing information about the flow of fluid and also indicating when fluid is flowing and when it is not. The preferred metering device emits pulses at a rate proportional to the flow rate. A counter accumulates a pulse count during each period of fluid flow. A separate pulse sensing network senses the beginning and end of each period of fluid flow and disables and initializes the counter whenever fluid is not flowing. The accumulated pulse count in the counter is proportional to the quantity of fluid passing through the meter. The counter is set to close a solenoid valve whenever a predetermined maximum pulse count is exceeded. A back-up protective circuit is also provided, employing a timer to measure the time interval of each fluid-flow cycle. When the time interval is exceeded, the timer closes the solenoid valve. In addition to the flood protector mode of operation, a configuration employing the same circuit as a dispenser control device is also disclosed.

A FOURTH EXAMPLE, U.S. Patent Office Document No. 5,568,825, Issued on Oct. 29, 1996, to Faulk teaches a system for detecting leakage and unwanted flow in a fluid supply within a building capable of detecting small leaks and shutting off flow when such occur. The system may be operated in a continuous mode or on a timed mode, and the system allows flow for a preset small time period before the shut-off is initiated. The system includes an inflow sensor, a discharge sensor and valve means to seal the supply conduit in the event of unwanted fluid flow or back flow in the discharge conduit. The system is extremely sensitive due to the provision of a by-pass conduit around a check-valve in the supply conduit, where the flow sensor is positioned in the by-pass conduit, such that small volume water flow must pass through the flow sensor.

A FIFTH EXAMPLE, U.S. Patent Office Document No. 5,967,171, Issued on Oct. 19, 1999, to Dwyer Jr. teaches a system for use with a normally open manually actuated water valve, or any other suitable manually actuated device, for automatically closing the valve, or device, upon sensing water. The system includes at least one water sensor electrically connected to a motorized actuator mounted on the valve, or device, whereby a signal is transmitted either by electrical conductor, or in an alternate embodiment by RF transmission, to the motorized actuator upon sensing water, whereby the manual valve is automatically actuated to its closed position. The system may be installed on an otherwise conventional manual shut-off valve, without replacing the valve or otherwise interrupting flow through the valve.

A SIXTH EXAMPLE, U.S. Patent Office Document No. 6,057,770, Issued on May 2, 2000, to Justesen teaches a device for detecting water leakage and preventing flooding from a water-utilizing appliance connected to water supply lines with water hoses, comprising a main electric unit which attaches to a power line. The main electric unit includes outlets, into which the power cords of the water-utilizing appliance are plugged, and a plurality of water sensor strips extending from the main electric unit for detecting the presence of water. The water leakage detection and flood prevention device further comprises solenoid-actuated cut-off valves connected between the water supply lines and the water hoses of the water-utilizing appliance. When a water leak is detected by the water sensor strips, a circuit breaker within the main electric unit shuts off, cutting power to the outlets and the solenoid-actuated cut-off valve, thereby disconnecting the water supply and electric power to the water-utilizing appliance in order to prevent a flood.

A SEVENTH EXAMPLE, U.S. Patent Office Document No. 6,389,852, Issued on May 21, 2002, to Montgomery teaches a water supply safety valve kit for an appliance in which the kit includes an individual solenoid actuated normally closed valve unit for each water supply line to the appliance and a control unit that plugs into a conventional electrical female household outlet. The control unit has a first outlet at the household line voltage and into which the power cord of the appliance plugs and a second lower voltage outlet responsive to current flow to the first outlet. A count down timer circuit and a low voltage output are activated by the current flow to the first outlet and lines connect that low voltage output to the solenoid valve unit to open the same. The count down timer terminates the low voltage output after a preselected time period.

AN EIGHTH EXAMPLE, U.S. Patent Office Document No. 6,675,826, Issued on Jan. 13, 2004, to Newman et al. teaches a flood prevention system which includes a double-latching solenoid valve that shuts off a water supply line in response to a moisture sensor detecting a leak in a plumbing system. The double-latching feature provides the solenoid's plunger with two positions of equilibrium. This minimizes electrical power consumption so that the flood prevention system can be battery operated. To minimize a buildup of hard water deposits, the valve includes a flexible diaphragm and is cycled periodically regardless of whether flooding occurs. The sensor includes multiple methods of mounting to a floor.

A NINTH EXAMPLE, U.S. Patent Office Publication No. 2007/0289635, Published on Dec. 20, 2007, to Ghazarian et al. teaches a supervised wireless leak detection system, having a leak detection sensor unit, capable of transmitting a uniquely coded signal in response to a detected leak, a supervised wireless valve control transceiver unit having a receiver, capable of receiving the uniquely coded signal, and a transmitter for feeding the uniquely coded signal within the system, a valve shut-off mechanism in communication with the valve control transceiver unit the valve shut-off mechanism having a motor attached to a valve, the motor creating a rotation pulse used to close and open the valve, and a processor having an electronic circuitry containing sensor(s), detecting the motor rotation pulse count during a motorized valve closure or open process. The processor functions in a setup process to memorize (learn) the motor rotation pulse count, required, to close and or to open the valve. Wherein the processor upon receipt of the uniquely coded signal in response to a detected leak, applies power to the motor to close the valve, the motor controlled to stop turning the valve in response to a processor received motor rotation pulse count number, substantially equal to a previously stored number needed to close or open the valve. A digital, voice, or SMS text message phone dialer is add to dispatch the detected leak signals, and notify monitoring personnel supervised system operation, end provide user access to turn on or off a valve(s) from a remote location(s).

A TENTH EXAMPLE, U.S. Patent Office Document No. 7,753,071, Issued on Jul. 13, 2010, to Wood teaches a leak detector pad comprising a circuit board having a bottom surface and a top surface, spaced first and second electrically conductive traces located on the bottom surface, and an electronic circuit mounted on the top surface. The circuit includes a first segment adapted to create an alternating current (AC) voltage waveform, a second segment adapted to apply the AC voltage waveform between the traces on the bottom surface of the circuit board, a third segment adapted to create a measure of a capacitance between the traces based upon an AC current flowing between the traces as a result of the AC voltage waveform, and a fourth segment adapted to create a direct current (DC) voltage alarm signal if the measure of capacitance provided by the third segment indicates the presence of fluid.

AN ELEVENTH EXAMPLE, U.S. Patent Office Document No. 2,798,503 issued on Jul. 9, 1957, to Carver teaches the combination of an inlet pipe for a water heater or the like, a drip pan to localize and contain leakage water, a cut-off valve in said inlet pipe, said valve being biased toward closed position, a water softenable and rupturable link having attachment means at opposite ends, one of said attachment means being affixed to said pan near the bottom thereof, a cable operatively connecting said cut-off valve to the other of said attachment means and holding the valve in open position.

It is apparent now that numerous innovations for various emergency shutoff systems have been provided in the prior art that are adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a flood detection and valve shutoff device that avoids the disadvantages of the prior art.

ANOTHER OBJECT of the present invention is to provide a flood detection and valve shutoff device that is simple and inexpensive to manufacture.

ANOTHER OBJECT of the present invention is to provide a flood detection and valve shutoff device for an appliance without altering the existing supply valve or modifying any plumbing to the appliance.

STILL ANOTHER OBJECT of the present invention is to provide a flood detection and valve shutoff device that is simple to use.

BRIEFLY STATED, STILL YET ANOTHER OBJECT of the present invention is to provide a flood detection and valve shutoff device which comprises a water sensitive sensor. A mechanism is for retaining the water sensitive sensor on a floor near a water heater. Another mechanism is for biasing a valve in a water inlet pipe of the water heater to a closed position. A lanyard in a taut condition extends between the water sensitive sensor and the biasing mechanism, so as to keep the valve in an open position. When the water sensitive sensor detects water on the floor the lanyard will be released from the water sensitive sensor, causing the biasing means to move the valve from the open position to the closed position.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

Figure 1:
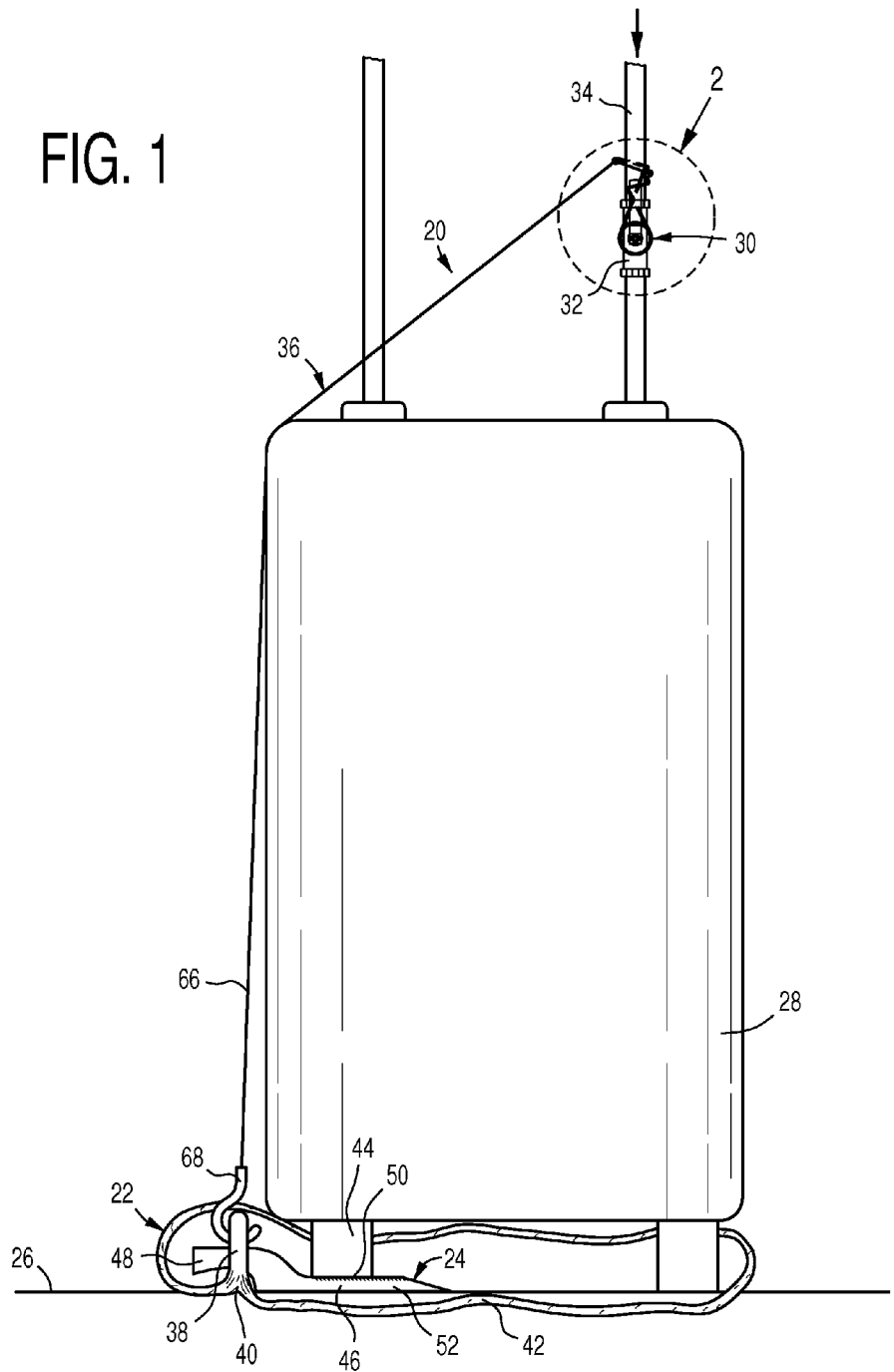
FIG. 1 is a diagrammatic elevational view of an embodiment of the present invention installed onto a water heater.

| A MARSHALING OF REFERENCE NUMERALS UTILIZED IN THE DRAWING | |
|---|---|
| 20 | flood detection and valve shutoff device |
| 22 | water sensitive sensor of device 20 |
| 24 | retaining mechanism of device 20 |
| 26 | floor |
| 28 | water heater |
| 30 | biasing mechanism of device 20 |
| 32 | valve in water inlet pipe 34 |
| 34 | water inlet pipe of water heater 28 |
| 36 | lanyard of device 20 |
| 38 | water softenable ring of water sensitive sensor 22 |
| 40 | wicking protrusion of water softenable ring 38 |
| 42 | elongated wick of water sensitive sensor 22 |
| 44 | foot of water heater 28 |
| 46 | wedge for retaining mechanism 24 |
| 48 | forward undercut end of wedge 46 |
| 50 | non-slip upper surface of wedge 46 |
| 52 | rearward end of wedge 46 |
| 54 | torsion spring for biasing mechanism 30 |
| 56 | first leg of torsion spring 54 |
| 58 | first eye loop on first leg 56 |
| 60 | second leg of torsion spring 54 |
| 62 | second eye loop on second leg 60 |
| 64 | lever arm of valve 32 |
| 65 | aperture in lever arm 64 |
| 66 | cable of lanyard 36 |
| 68 | hook of lanyard 36 |
| 70 | moisture inhibitor in water softenable ring 38 |
| 72 | alternate retaining mechanism of device 20 |
| 74 | wedge for alternate retaining mechanism 72 |
| 76 | curved forward undercut end of wedge 74 |
| 78 | bent up portion of curved forward undercut end 76 |

DETAILED DESCRIPTION OF THE PREFERRED EMBODIMENT

Figure 2:
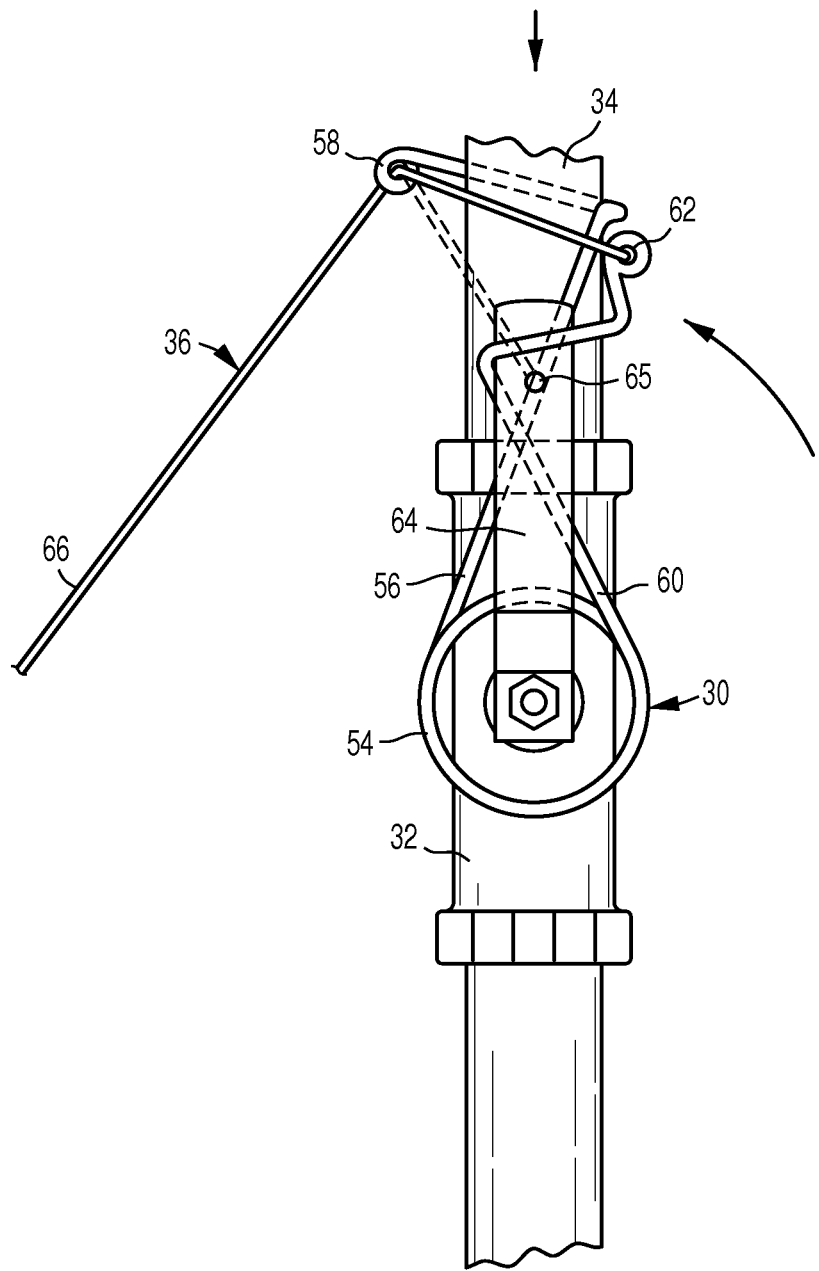
FIG. 2 is an enlarged diagrammatic elevational view of the area enclosed in the dotted circle indicated by arrow 2 in FIG. 1, showing the bias mechanism and the valve in the water inlet pipe of the water heater in an open position.
Figure 3:
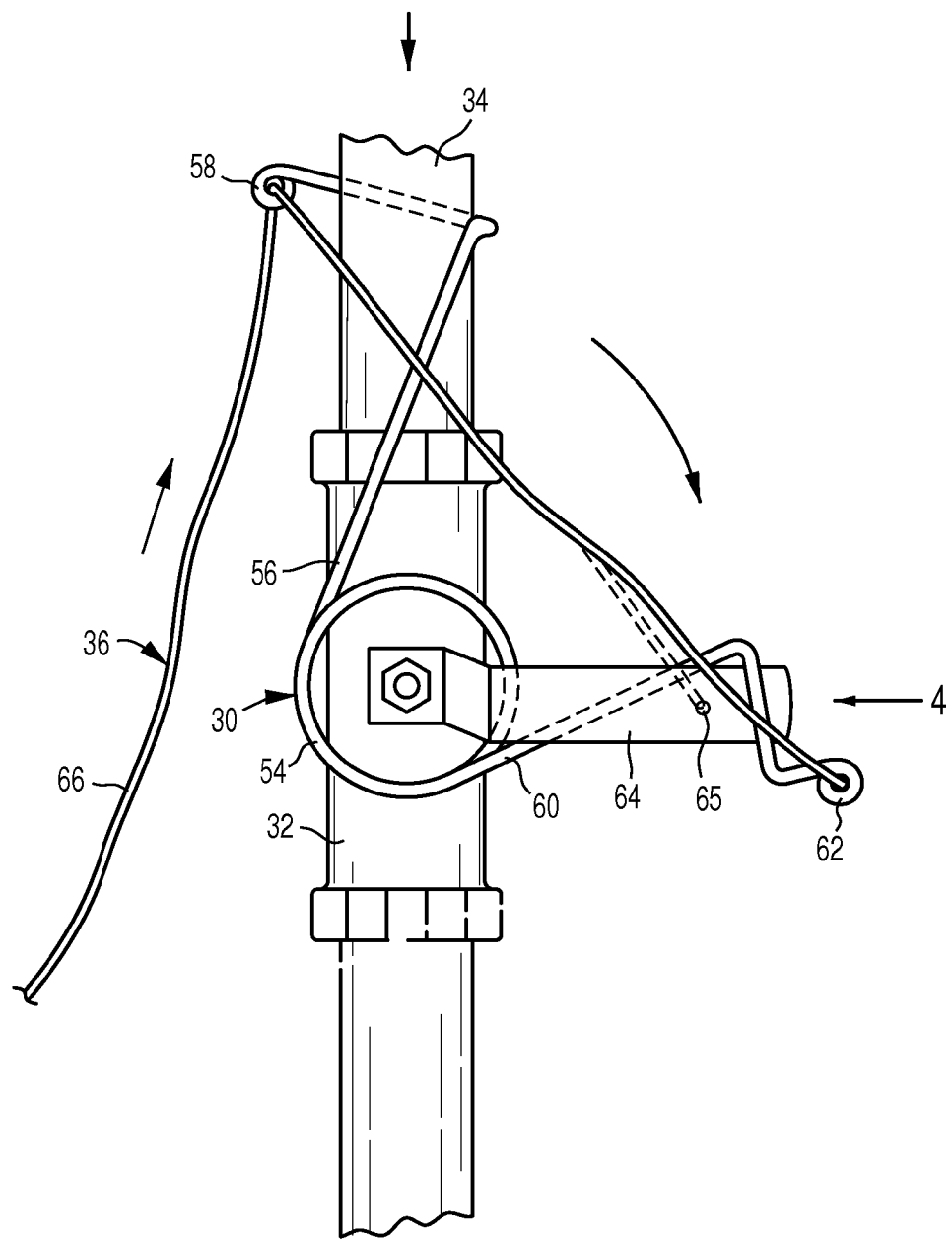
FIG. 3 is an enlarged diagrammatic elevational view, similar to FIG. 2, showing the valve in a closed position.
Figure 4:
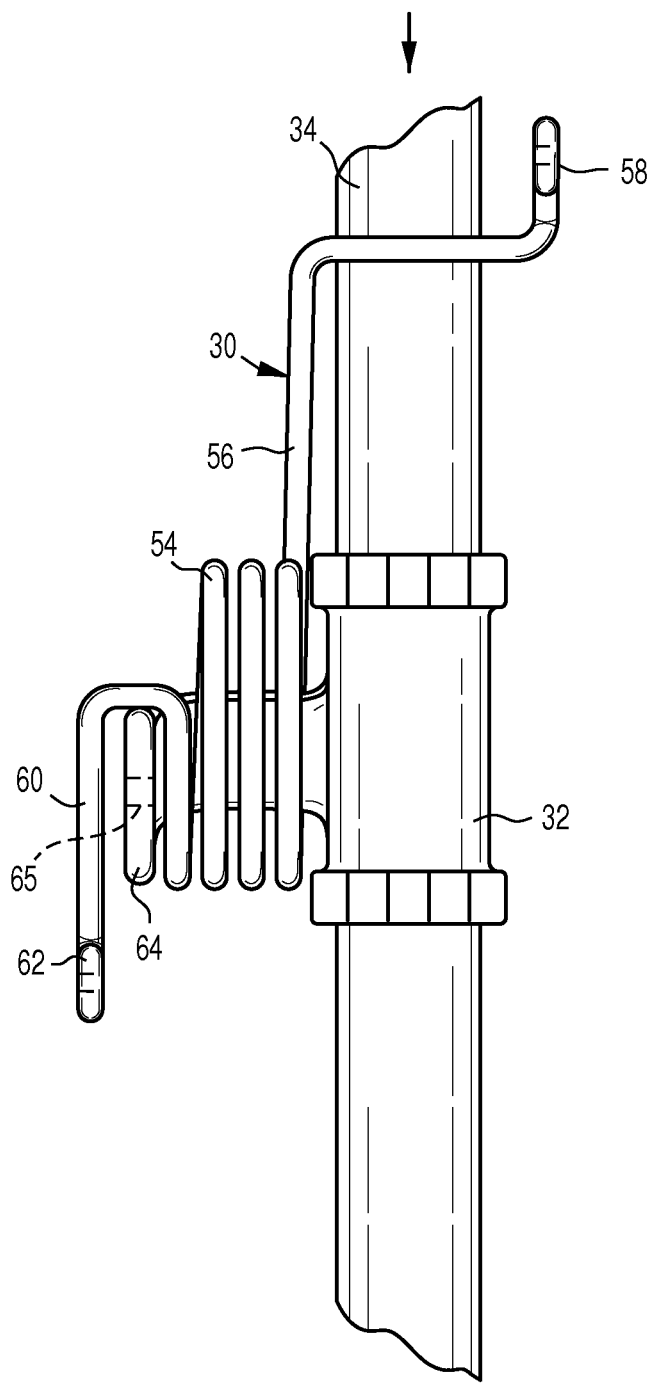
FIG. 4 is an enlarged diagrammatic elevational view taken in the direction of arrow 4 in FIG. 3 with the lanyard removed therefrom.
Figure 5:
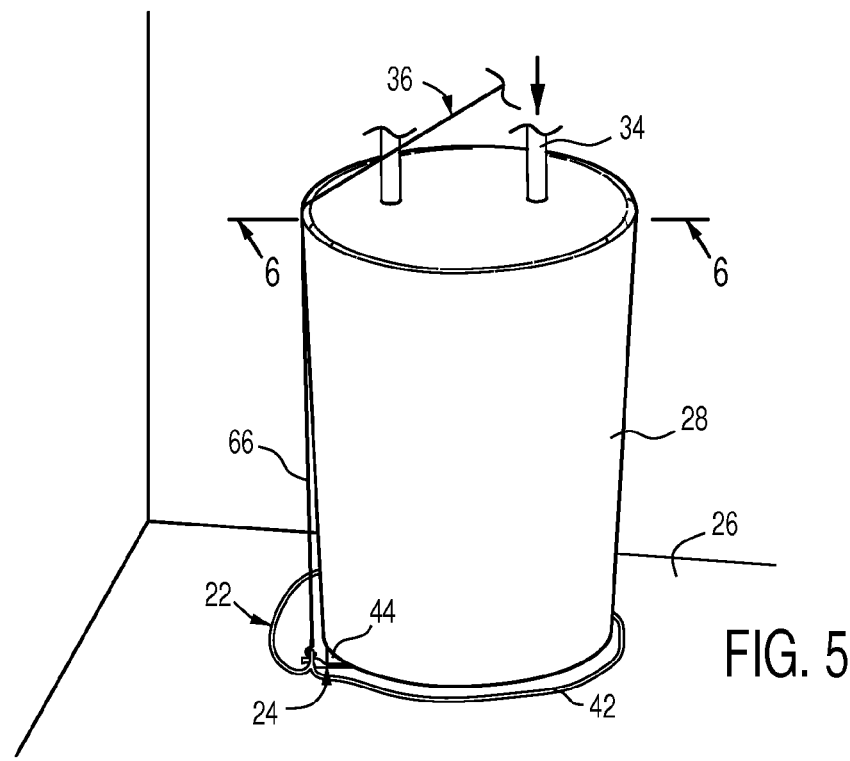
FIG. 5 is a diagrammatic perspective view of the water heater, with parts broken away, showing some of the components of the present invention installed thereon.
Figure 6:
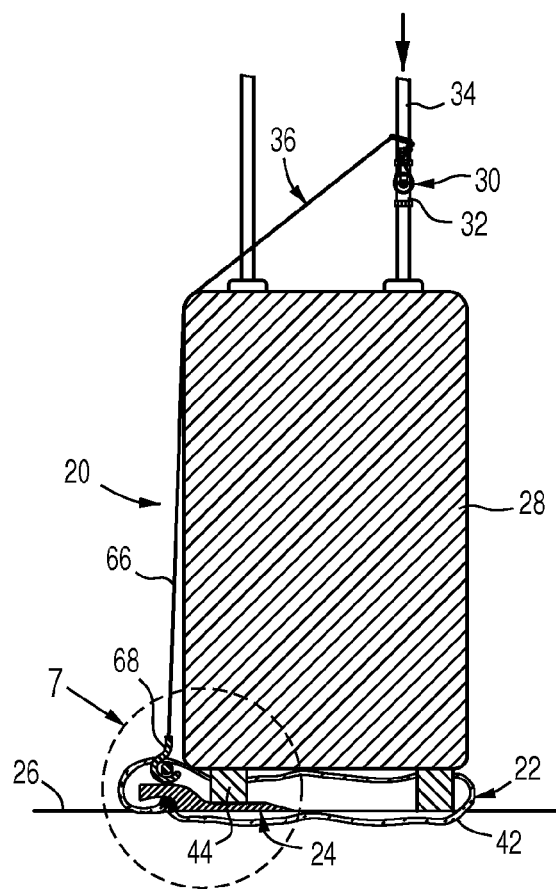
FIG. 6 is a diagrammatic cross sectional view taken on line 6-6 in FIG. 5.
Figure 7:
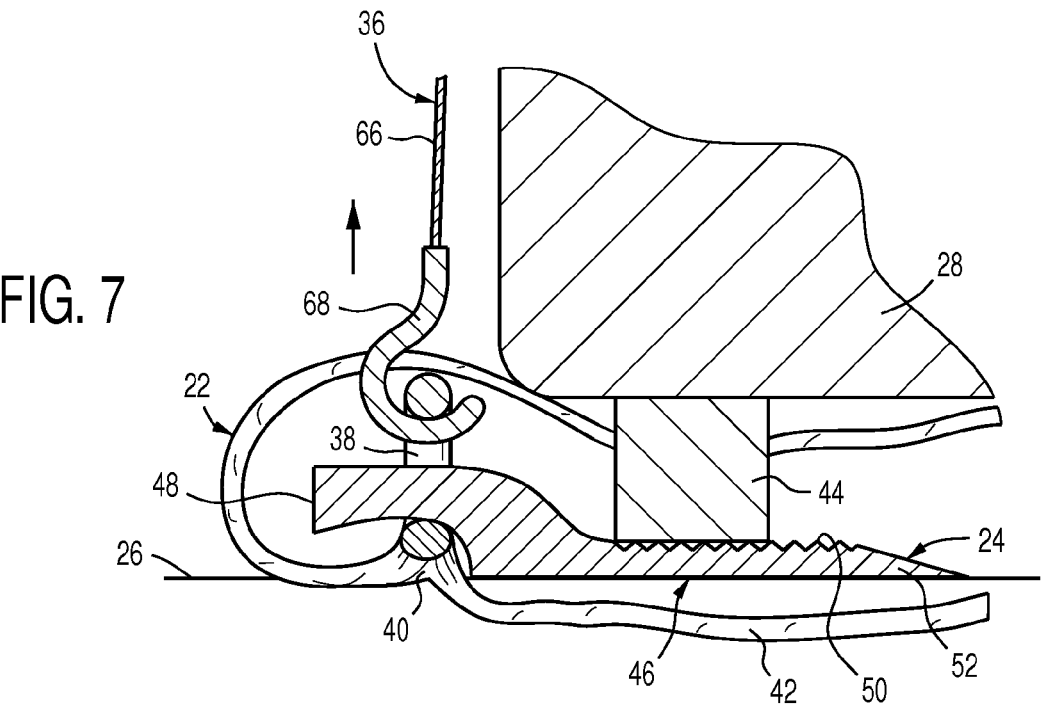
FIG. 7 is an enlarged diagrammatic cross sectional view of the area enclosed in the dotted circle indicated by arrow 7 in FIG. 6, showing the various components therein in greater detail.
Figure 8:
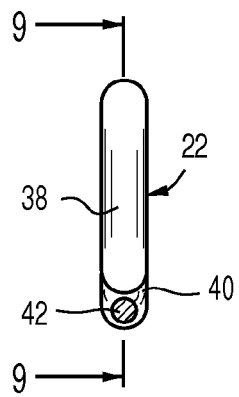
FIG. 8 is a diagrammatic side view of the water sensitive sensor.
Figure 9:
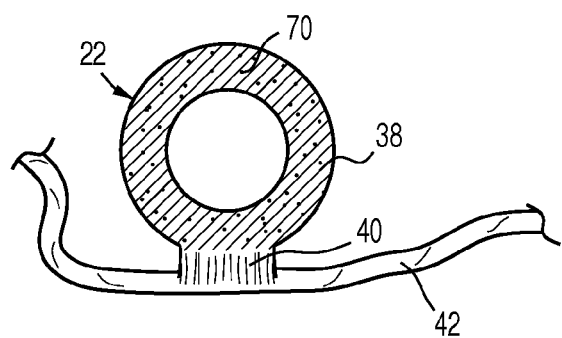
FIG. 9 is a diagrammatic cross sectional view taken on line 9-9 in FIG. 8.

Referring now to the figures, in which like numerals indicate like parts, and particularly to FIG. 1, through 9, which are a diagrammatic elevational view of an embodiment of the present invention installed onto a water heater; an enlarged diagrammatic elevational view of the area enclosed in the dotted circle indicated by arrow 2 in FIG. 1, showing the bias mechanism and the valve in the water inlet pipe of the water heater in an open position; an enlarged diagrammatic elevational view, similar to FIG. 2, showing the valve in a closed position; an enlarged diagrammatic elevational view taken in the direction of arrow 4 in FIG. 3 with the lanyard removed therefrom; a diagrammatic perspective view of the water heater, with parts broken away, showing some of the components of the present invention installed thereon; a diagrammatic cross sectional view taken on line 6-6 in FIG. 5; an enlarged diagrammatic cross sectional view of the area enclosed in the dotted circle indicated by arrow 7 in FIG. 6, showing the various components therein in greater detail; a diagrammatic side view of the water sensitive sensor; a diagrammatic cross sectional view taken on line 9-9 in FIG. 8 and as such, will be discussed with reference thereto.

The present invention is a flood detection and valve shutoff device 20 which comprises a water sensitive sensor 22. A mechanism 24 is for retaining the water sensitive sensor 22 on a floor 26 near a water heater 28. Another mechanism 30 is for biasing a valve 32 in a water inlet pipe 34 of the water heater 38 to a closed position. A lanyard 36 in a taut condition extends between the water sensitive sensor 22 and the biasing mechanism 30, so as to keep the valve 32 in an open position. When the water sensitive sensor 22 detects water on the floor 26 the lanyard 36 will be released from the water sensitive sensor 22, causing the biasing mechanism 30 to move the valve 32 from the open position to the closed position.

The water sensitive sensor 22 comprises a water softenable ring 38 having a wicking protrusion 40 extending therefrom. An elongated wick 42 extends from the wicking protrusion 40 of the water softenable ring 38 and about the feet 44 of the water heater 28 to facilitate water absorption into the water softenable ring 38 when the water heater 28 leaks.

The retaining mechanism 24 comprises a wedge 46 having a forward undercut end 48 and a non-slip upper surface 50 at a rearward end 52 thereof. The wedge 46 can be inserted between a foot 44 of the water heater 28 and the floor 26 in which the forward undercut end 48 will maintain the water softenable ring 38 in place.

The biasing mechanism 30 comprises a torsion spring 54 having a first leg 56 with a first eye loop 58 on the first leg 56 extending about the water inlet pipe 34, and a second leg 60 with a second eye loop 60 on which wraps about a lever arm 64 of the valve 32. The lanyard 36 extends through the first eye loop 58 and is affixed to the second eye loop 62. The torsion spring 54 will normally keep the lever arm 64 of the valve 32 in a closed position. As best shown in FIGS. 2 and 3, the distal end of the lanyard 36 can be affixed to an aperture 65 in the lever arm 64 instead of the second eye loop 62.

The lanyard 36 comprises an elongated cable 66. A hook 68 is on a lower end of the cable 66 which engages with the water softenable ring 38 of the water sensitive sensor 22. When the water softenable ring 38 receives water from the elongated wick 42, the water softenable ring 38 will break causing the hook 68 on the cable 66 to become free causing the cable 66 to lose tension, which allows the torsion spring 54 to move the lever arm 64 of the valve 32 to the closed position.

As best seen in FIG. 9, the water softenable ring 38 can comprise a moisture inhibitor 70 applied therein for use in areas subject to high humidity to keep the water softenable ring 38 from prematurely rupturing under very humid conditions, while the elongated wick 42 will not be subjected to the moisture inhibitor.

Figure 10:
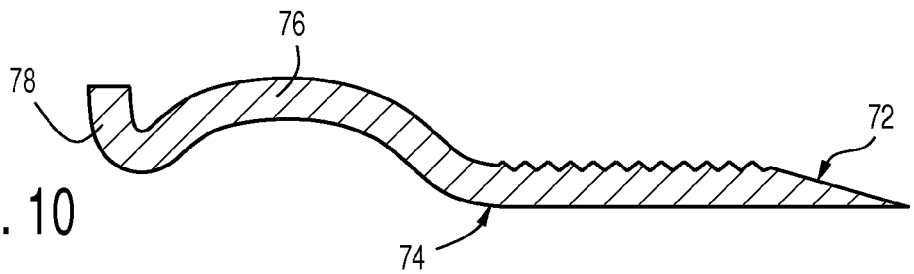
FIG. 10 is a diagrammatic cross sectional view of an alternate retaining mechanism.

FIG. 10 is a diagrammatic cross sectional view of an alternate retaining mechanism, and as such, will be discussed with reference thereto. The alternate retaining mechanism 72 consists of a wedge 74 in which the forward undercut end 76 is curved and has a bent up portion 78 to accommodate tapping with a hammer.

It will be understood that each of the elements described above, or two or more together, may also find a useful application in other types of constructions differing from the types described above.

While the invention has been illustrated and described as embodiments of a flood detection and valve shutoff device, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A flood detection and valve shutoff device which comprises:
   A) a water sensitive sensor, wherein said water sensitive sensor comprises:

a) a water softenable ring having a wicking protrusion extending therefrom; and b) an elongated wick extending from the wicking protrusion of said water softenable ring and about the feet of the water heater to facilitate water absorption into said water softenable ring when the water heater leaks;

B) means for retaining said water sensitive sensor on a floor near a water heater;

C) means for biasing a valve in a water inlet pipe of the water heater to a closed position; and D) a lanyard in a taut condition extending between said water sensitive sensor and said biasing means so as to keep the valve in an open position, whereby when said water sensitive sensor detects water on the floor said lanyard will be released from the water sensitive sensor, causing said biasing means to move the valve from the open position to the closed position.

2. The device as recited in claim 1, wherein said retaining means comprises a wedge having a forward undercut end and a non-slip upper surface at a rearward end thereof, said wedge can be inserted between a foot of the water heater and the floor in which the forward undercut end will maintain said water softenable ring in place.

3. The device as recited in claim 1, wherein said biasing means comprises a torsion spring having a first leg with a first eye loop on the first leg extending about the water inlet pipe and a second leg with a second eye loop on the second leg which wraps about a lever arm of the valve, wherein said lanyard extends through the first eye loop and is affixed to the second eye loop, whereby said torsion spring will normally keep the lever arm of the valve in a closed position.

4. The device as recited in claim 3, wherein said lanyard comprises:

a) an elongated cable; and b) a hook on a lower end of said cable which engages with said water softenable ring of said water sensitive sensor, whereby when said water softenable ring receives water from said elongated wick, said water softenable ring will break causing said hook on said cable to become free causing said cable to lose tension, which allows said torsion spring to move the lever arm of the valve to the closed position.

5. The device as recited in claim 1, wherein said water softenable ring comprises a moisture inhibitor applied therein for use in areas subject to high humidity to keep said water softenable ring from prematurely rupturing under very humid conditions, while said elongated wick will not be subjected to said moisture inhibitor.

6. The device as recited in claim 2, wherein said wedge further comprises the forward undercut end being curved and having a bent up portion to accommodate tapping with a hammer.

* * * * *